United States Patent
Park (10) Patent No.: US 7,979,611 B2
(45) Date of Patent: Jul. 12, 2011

(54) MULTI-PROTOCOL SERIAL INTERFACE APPARATUS AND SYSTEM-ON-CHIP APPARATUS INCLUDING THE SAME

(75) Inventor: Chang-jae Park, Gyeonggi-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 280 days.

(21) Appl. No.: 12/052,346

(22) Filed: Mar. 20, 2008

(65) Prior Publication Data

US 2008/0244120 A1    Oct. 2, 2008

(30) Foreign Application Priority Data

Mar. 27, 2007  (KR) .................. 10-2007-0030049

(51) Int. Cl.
- G06F 13/38 (2006.01)
- G06F 13/00 (2006.01)
- G06F 3/00 (2006.01)

(52) U.S. Cl. ............ 710/65; 710/11; 710/33; 710/68; 711/200

(58) Field of Classification Search .............. None
See application file for complete search history.

(56) References Cited

U.S. PATENT DOCUMENTS

| | | | |
|---|---|---|---|
| 2002/0002640 A1* | 1/2002 | Barry et al. | 710/22 |
| 2002/0168026 A1* | 11/2002 | Khoini-Poorfard | 375/303 |
| 2003/0055922 A1* | 3/2003 | Kim et al. | 709/220 |
| 2004/0008713 A1* | 1/2004 | Knight et al. | 370/428 |
| 2005/0021874 A1 | 1/2005 | Georgiou et al. | |
| 2005/0235088 A1* | 10/2005 | Kang | 710/305 |
| 2006/0098675 A1* | 5/2006 | Okuno | 370/412 |
| 2006/0149870 A1* | 7/2006 | Sears et al. | 710/71 |
| 2006/0251109 A1* | 11/2006 | Muller et al. | 370/463 |
| 2007/0168731 A1* | 7/2007 | Lambrache et al. | 714/30 |
| 2007/0220499 A1* | 9/2007 | Bannatyne et al. | 717/140 |

FOREIGN PATENT DOCUMENTS

| | | |
|---|---|---|
| EP | 1 496 444 A2 | 1/2005 |
| JP | 2002-318783 | 10/2002 |

OTHER PUBLICATIONS

Office Action in corresponding Korean Application No. 10-2007-0030049; Date of mailing May 31, 2008.

* cited by examiner

Primary Examiner — Henry W Tsai
Assistant Examiner — Michael Sun
(74) Attorney, Agent, or Firm — Myers Bigel Sibley & Sajovec, P.A.

(57) ABSTRACT

A multi-protocol serial interface (MPSI) apparatus can include a controller circuit that is configured to receive information about a type of MPSI utilized for data transfer and that is configured to control a format of the data transfer and input/output timing associated with the data transfer. A data generation and processing circuit is coupled to the controller circuit and is configured to extract information from a buffer memory to generate data for the data transfer according to the format based on the information and is configured to generate the data in a packet format or a bit format based on the information.

25 Claims, 6 Drawing Sheets

MULTI-PROTOCOL SERIAL INTERFACE APPARATUS AND SYSTEM-ON-CHIP APPARATUS INCLUDING THE SAME

CROSS-REFERENCE TO RELATED PATENT APPLICATION

This application claims the benefit of Korean Patent Application No. 10-2007-0030049, filed on Mar. 27, 2007, in the Korean Intellectual Property Office, the disclosure of which is incorporated herein in its entirety by reference.

FIELD OF THE INVENTION

The present invention relates to a multi-protocol serial interface (MPSI) apparatus, and more particularly, to an MPSI apparatus capable of generating and receiving data using various types of protocols.

BACKGROUND

A multi-protocol serial interface (MPSI) apparatus is designed to transmit and receive data corresponding to a plurality of protocols between two different devices.

An interface protocol may vary according to whether (i) synchronous or asynchronous operations are performed, (ii) the bit width of bits transmitted at a time, (iii) whether error correction is to be performed, and (iv) whether a strobe signal is applied.

A widely used universal asynchronous receiver/transmitter (UART) consecutively transmits 7 or 8 bits of data. Once a specific voltage level changes from logic high to logic low, the UART senses the change and starts data transmission. By incorporating a stop bit into the last of the consecutive bits, the UART indicates the end of the data transmission.

Pulse-code modulation (PCM) and a serial peripheral interface (SPI) are used to perform data transmission and reception in synchronization with a clock signal and directly transmit and receive binary data.

An audio codec (AC) 97 is used to transmit and receive data in packet form.

A conventional MPSI apparatus is separately designed for each type of protocol. Conventionally, several MPSI apparatuses are included in a single block in order to interface data corresponding to different types of protocols.

Figure 1A:
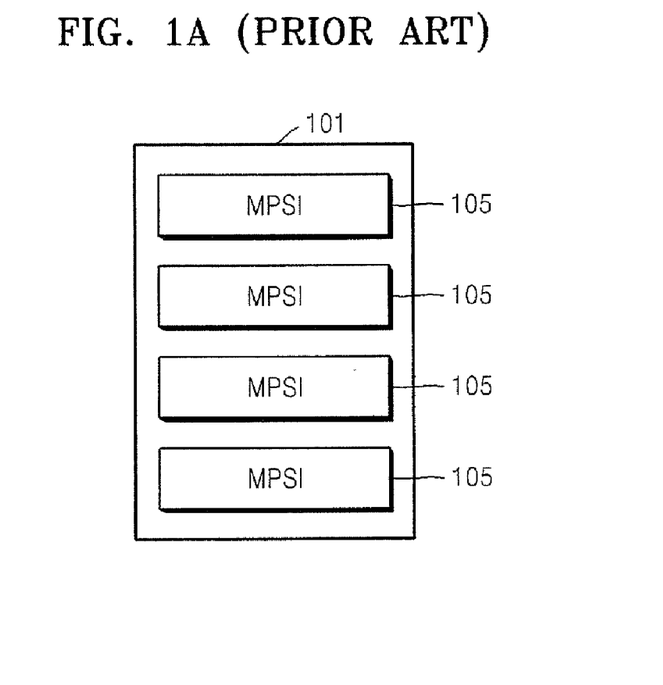
FIG. 1A is a block diagram of a general multi-protocol serial interface (MPSI) block including a plurality of MPSI apparatuses.

FIG. 1A is a block diagram of a general MPSI block 101 including a plurality of MPSI apparatuses.

Referring to FIG. 1A, the MPSI block 101 includes a plurality of MPSI apparatuses 105. In FIG. 1A, four MPSI apparatuses 105 are include in the single MPSI block 101.

Figure 1B:
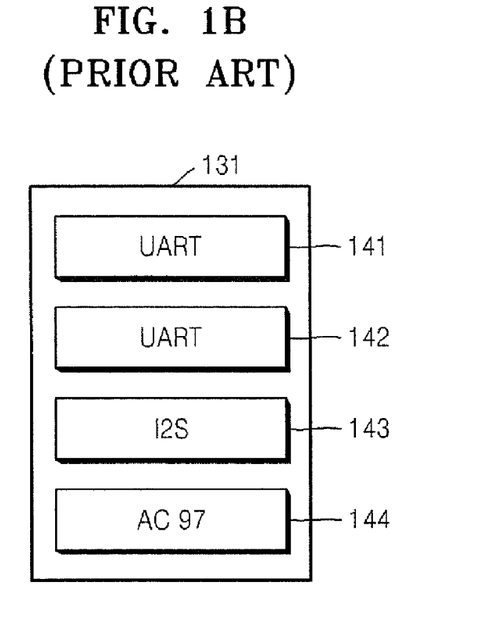
FIG. 1B is a block diagram illustrating an example of a structure of the MPSI block illustrated in FIG. 1A.

FIG. 1B is a block diagram illustrating an example of a structure of the MPSI block 101 illustrated in FIG. 1A.

Figure 1C:
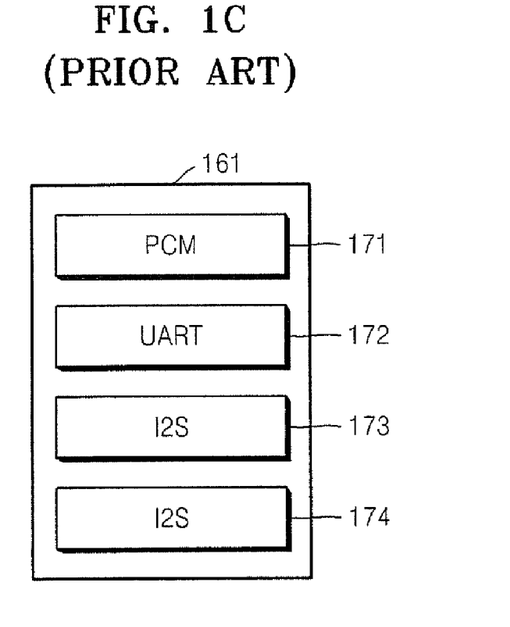
FIG. 1C is a block diagram illustrating another example of a structure of the MPSI block illustrated in FIG. 1A.

Referring to FIG. 1B, an MPSI block 131 includes four MPSI apparatuses, and more specifically, UARTs 141 and 142, one Inter-IC Sound (I2S) 143, and one Audio Codec (AC) 97 144. FIG. 1C is a block diagram illustrating another example of a structure of the MPSI block 101 illustrated in FIG. 1A.

Referring to FIG. 1C, an MPSI block 161 includes four MPSI apparatuses, and more specifically, one PCM 171, one UART 172, and first and second I2Ss 173 and 174.

In the MPSI block 131 of FIG. 1B, it is not possible to use three UARTs and to perform an interface using protocols other than those included in the MPSI block 131. In other words, if the MPSI block 131 of FIG. 1B, includes three UARTs it may be difficult to also include PCM, Infrared Data Association (IrDA), or an SPI as an interface in the MPSI block 131 as well.

In the MPSI block 161 of FIG. 1C, it is not possible to use at least two UARTs and to perform an interface using protocols other than those included in the MPSI block 161. Moreover, for an interface using the PCM 171 and the first I2S 173, the UART 172 and the second I2S 174 are not used, degrading the use efficiency of a chip.

As discussed above, a conventional MPSI block or a conventional system-on-chip (SOC) including a plurality of MPSI apparatuses can perform an interface using only a protocol that is initially included during a design stage. As a result, an interface using protocols other than the initially included protocol may be difficult. Moreover, in such a conventional MPSI block or conventional system-on-chip (SOC), several MPSI apparatuses are not used, degrading the use efficiency of the entire MPSI block.

SUMMARY

Embodiments according to the present invention can provide a multi-protocol serial interface (MPSI) apparatus that can be flexibly used according to a protocol desired by a user. In some embodiments according to the present invention, a system-on-chip (SOC) apparatus can be provided. In some embodiments according to the present invention, an SOC apparatus can include a plurality of MPSI apparatuses that share a single buffer memory, which may thereby reduce the size of a buffer memory.

In some embodiments according to the present invention a multi-protocol serial interface (MPSI) apparatus can include a controller circuit that is configured to receive information about a type of MPSI utilized for data transfer and that is configured to control a format of the data transfer and input/output timing associated with the data transfer. A data generation and processing circuit is coupled to the controller circuit and is configured to extract information from a buffer memory to generate data for the data transfer according to the format based on the information and is configured to generate the data in a packet format or a bit format based on the information.

BRIEF DESCRIPTION OF THE DRAWINGS

The above and other features and advantages of the present invention will become more apparent by describing in detail exemplary embodiments thereof with reference to the attached drawings in which:

FIG. 4C illustrates packet data used in an AC97 or the like;

DESCRIPTION OF EMBODIMENTS ACCORDING TO THE INVENTION

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. In the drawings, the thickness of layers and regions are exaggerated for clarity. Like numbers refer to like elements throughout. As used herein the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be understood that, although the terms first, second, etc. may be used herein to describe various elements, these elements should not be limited by these terms. These terms are only used to distinguish one element from another. Thus, a first element could be termed a second element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be understood that the term "unit" is used herein to refer to logical functions which can structural embodiments, such as circuits. Accordingly, although the term "unit" is used, it will be understood that each of the units may be embodied as a structural circuit.

Figure 2:
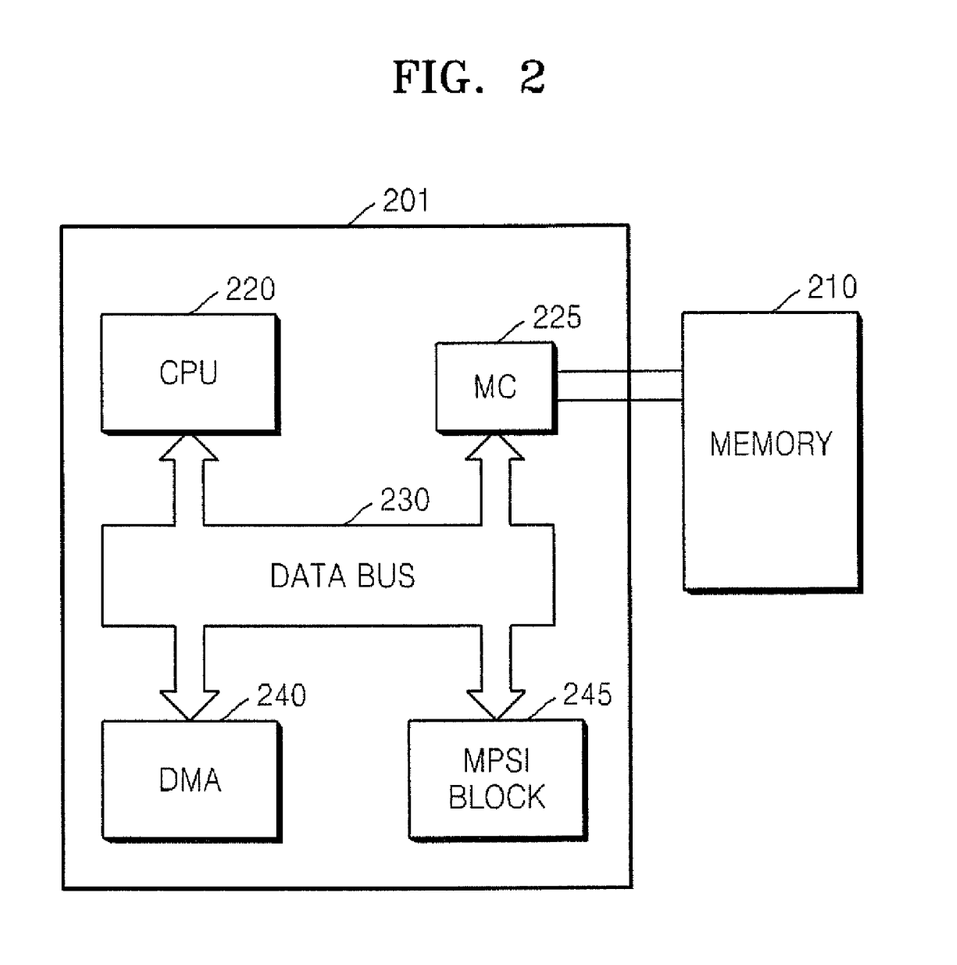
FIG. 2 is a block diagram of a system-on-chip (SOC) apparatus for an interface, in some embodiments according to the present invention.

FIG. 2 is a block diagram of a system-on-chip (SOC) apparatus 201 for an interface, in some embodiments according to the invention. Referring to FIG. 2, the SOC apparatus 201 for an interface according to the current embodiment of the present invention includes a central processing unit (CPU) 220, a memory controller (MC) 225, a direct memory access (DMA) 240, a multi-protocol serial interface (MPSI) block 245, and a data bus 230.

The CPU 220 is a central processing device for controlling the overall operation of the SOC apparatus 201. Thus, all intellectual property (IP) blocks included in the SOC apparatus 201 are controlled by the CPU 220.

The MC 225 controls data input to and data output from an external memory 210.

The DMA 240 allows data to be transmitted directly between a memory (the external memory 210) and the one of IP blocks without using the CPU 220.

The MPSI block 245 includes a plurality of MPSI apparatuses.

Hereinafter, each of the plurality of MPSI apparatuses included in the MPSI block 245 and the SOC apparatus 201 including the MPSI block 245 will be described in detail with reference to FIGS. 3 through 6.

Figure 3:
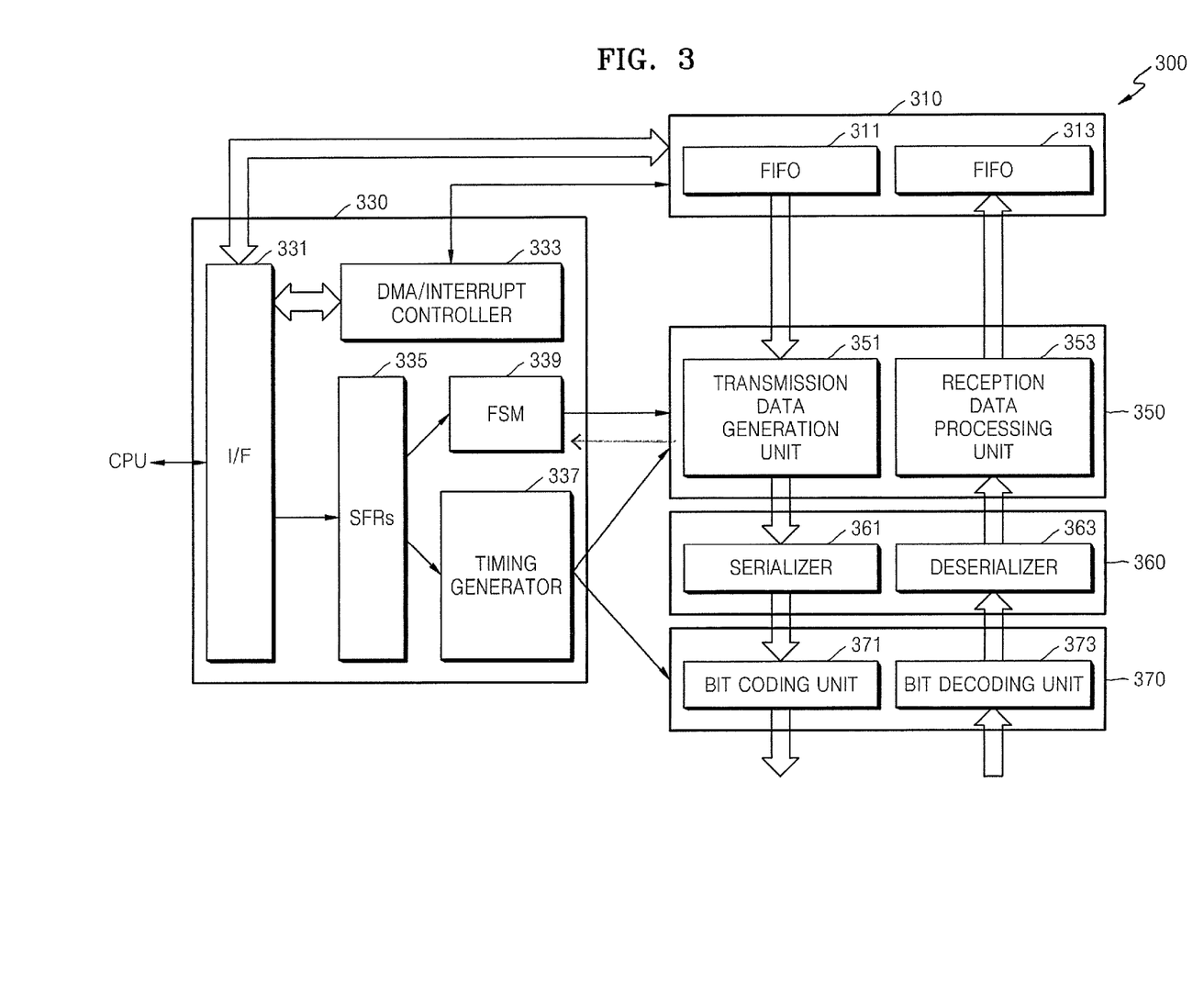
FIG. 3 is a block diagram of an MPSI apparatus in some embodiments according to the present invention.

FIG. 3 is a block diagram of an MPSI apparatus 300 (included in the MPSI block 245) according to an embodiment of the present invention.

Referring to FIG. 3, the MPSI apparatus 300 according to the current embodiment of the present invention includes a controller 330 and a data generation and processing unit 350. The MPSI apparatus 300 may further include a buffer memory 310, a serialization/deserialization unit 360, and a bit processing unit 370.

The controller 330 receives information about a type of MPSI needed for a data transfer and controls a control order or the format of interfaced data and input/output points of time (i.e., timing) according to the received information.

The controller 330 includes an interface (I/F) bus unit 331, a DMA/interrupt controller 333, a special function register (SFRs) 335, a finite state machine (FSM) 339, and a timing generator 337.

The I/F bus unit 331 is a general-purpose bus for an interface with a general-purpose on-chip bus.

The DMA/interrupt controller 333 controls the operation of the DMA 240, and controls a data processing order in consideration of interrupt generation upon generation of an interrupt request.

The SFRs 335 is requested by the external CPU 220 to operate with a particular MPSI. The request is provided by programming a value in the SFRs 335. For example, the SFRs 335 may recognize that it is to operate with a UART if '001' is stored in the $0^{th}$ address of the SFRs 335, to operate with an Inter-IC Sound (I2S) if '010' is stored in the $0^{th}$ address of the SFRs 335, and to operate with an audio codec (AC) 97 if '011' is stored in the $0^{th}$ address of the SFRs 335.

According to the type of a required MPSI, the SFRs 335 controls generation of data used by the required MPSI or input/output points of time using software. For example, if an AC97 using data in a packet form is required, the SFRs 335 generates packet data used in the AC97 by controlling the FSM 339 and the timing generator 337 and determines transmission and reception points of time with respect to the generated data. If a serial peripheral interface (SPI) using binary data synchronized with a clock signal is required, the SFRs 335 controls a bit decoding unit 373 to transmit received data to the buffer memory 310. In this case, a reception data processing unit 353 does not generate packet data because the SPI does not use data in a packet form.

The SFRs 335 is used for general purposes and its setting condition is set by a user separately for each protocol.

The FSM 339 adjusts the operation state transition of intellectual property (IP) blocks 315, and 361 included in the MPSI apparatus in response to a control signal output from the SFRs 335. The FSM 339, which is simple state logic circuit of a simple level, marks the order of operations performed by the IP blocks 315, 350, and 361 in response to a control signal input from the SFRs 335 with a state. In other words, the FSM 339 determines which operation a corresponding IP block is to perform in response to an input condition A.

For example, if an AC97 using data in a packet form is required, the SFRs 335 instructs the FSM 339 to generate packet data. In response to the instruction, the FSM 339 activates the transmission data generation unit 351 to generate packet data.

The timing generator 337 generates a clock signal and adjusts data transmission/reception points of time or a data processing point of time.

The buffer memory 310 stores transmission/reception data and includes a transmission buffer memory 311 and a reception buffer memory 313 (The transmission buffer memory 311 and the reception buffer memory 313 may be both first-in, first-out (FIFO) memories). The transmission data is stored in the transmission buffer memory 311, and a memory required for data reception is stored in the reception buffer memory 313.

During data transmission, the data generation and processing unit 350 extracts information required to generate data corresponding to the required MPSI from the transmission buffer memory 311 or the FSM 339. The data generation and processing unit 350 then outputs the generated data to the bit processing unit 370.

During data reception, the data generation and processing unit 350 receives data from outside through the bit processing unit 370, stores information data extracted by analyzing the received data in the reception buffer memory 310, and transmits state data to the controller 330. Herein, information data refers to data used as actual information (i.e. data transferred to/from the bit processing unit 370) and state data refers to data for indicating the state of the information data, e.g., input/output points of time with respect to the information data or the existence of errors in the information data. The data generation and processing unit 350 will be described later in detail with reference to FIG. 5.

The serialization/deserialization unit 360 includes a serializer 361 and a deserializer 363.

The bit processing unit 370 includes a bit coding unit 371 and the bit decoding unit 373. A signal output from the bit coding unit 371 and a signal input to the bit decoding unit 373 are used in actual serial interface communication and are input from or output to outside the MPSI apparatus 300.

The serializer 361 receives data that is generated by and output in parallel from the transmission data generation unit 351 and serializes the received data.

The bit coding unit 371 converts data stored in the buffer memory 310 into a form used by a required MPSI. Generally, in data signal transmission, a signal indicating '0' is a logic low signal and a signal indicating '1' is a logic high signal. However, there may be various data forms. For example, a peak pulse may not be generated for '0' and a peak pulse may be generated for '1', or a logic level may transit for '1' and a logic level may be maintained for '0'.

For example, the buffer memory 310 may store a signal indicating '0' as a logic low signal and a signal indicating '1' as a logic high level. Herein, it is assumed that a required MPSI (or SPI) uses a data form in which a logic level transition indicates '1' and a logic level that is maintained indicates '0'. The bit coding unit 371 then converts a data signal output from the buffer memory 310 into a data signal form used by the MPSI (or SPI).

The bit decoding unit 373 receives signals indicating '0' and '1' transmitted in different forms and converts the received signals into data suitable to be stored in the buffer memory 310. As mentioned above, generally a signal indicating '0' is a logic low signal and a signal indicating '1' is a logic high signal. However, there may be various data forms. For example, a peak pulse may not be generated for '0' and a peak pulse may be generated for '1', or a logic level may transit for '1' and a logic level may be maintained for '0'. The bit decoding unit 373 receives data in above-described various forms and analyzes signals, thereby converting the received data into bit data to be stored in the buffer memory 310.

The deserializer 363 divides serially input data in units of a particular number of bits or bytes and outputs the divided data in parallel. For example, 192 bytes of data transmitted serially may be output in parallel as six chunks of 32-byte data.

Figure 4A:
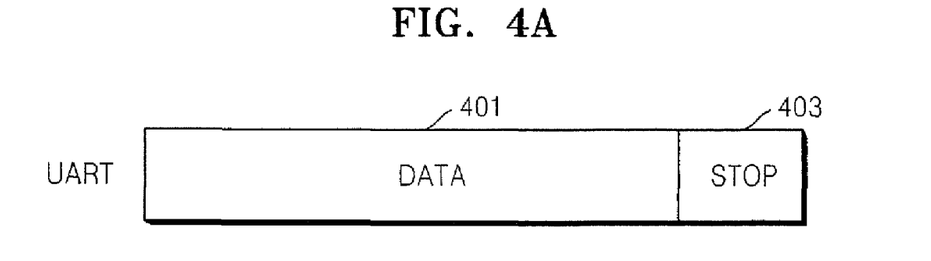
FIG. 4A illustrates the format of data used in a universal asynchronous receiver/transmitter (UART)

FIG. 4A illustrates the format of data used in a UART.

Referring to FIG. 4A, if a strobe signal transits from high to low, the UART senses the state transition and starts data transmission. The UART transmits 7- or 8-bit based data 401 and inserts a stop bit 403 into the last portion of the data 401. When a required MPSI is the UART, the data generation and processing unit 350 is not activated because the UART does not use data in a packet form.

Figure 4B:
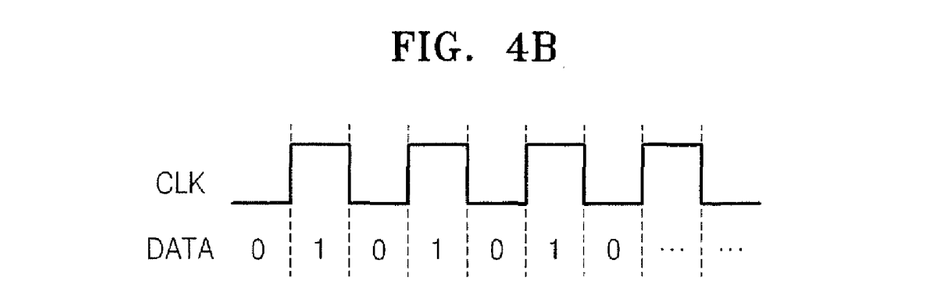
FIG. 4B illustrates the format of data used in a Serial Peripheral Interface (SPI) and pulse-coded modulation (PCM)

FIG. 4B illustrates the format of data used in a Serial Peripheral Interface (SPI) and pulse-coded modulation (PCM).

Referring to FIG. 4B, in a SPI and PCM, data is transmitted in synchronization with a clock signal. In other words, in a SPI and PCM, a data signal is transmitted bit-by-bit during each specific interval of the clock signal.

Figure 4C:
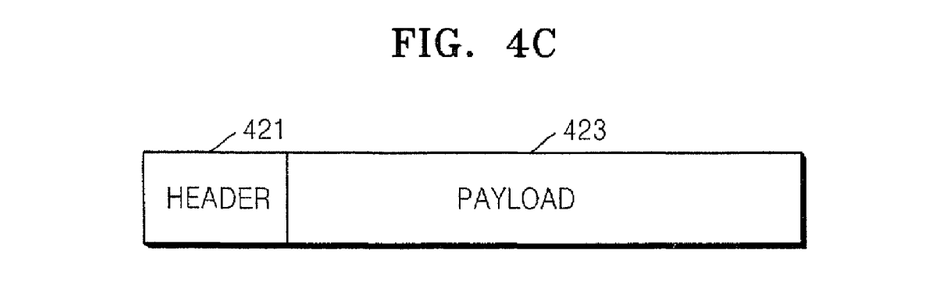

FIG. 4C illustrates packet data used in an AC97 or the like.

Referring to FIG. 4C, the AC97 uses data in a packet form. Data in a packet form includes a header 421 and a payload 423. The header 421 indicates what data is included in the payload 423. For example, if load time information is included in the payload 423, the header 421 includes information indicating that 'load time information starts'. The header 421 also includes information about the type of the payload 423 or additional information of packet data. In other words, the header 421 may include payload length information, an error correction code (ECC), or a portion of a cyclic redundancy check (CRC).

If a required MPSI uses packet data, the data generation and processing unit 350 is activated in order to generate packet data or divide packet data into different portions such as the header 421, the payload 423, a CRC (not shown), and an ECC (not shown) for transmission to the controller 330 or the buffer memory 310.

Figure 4D:
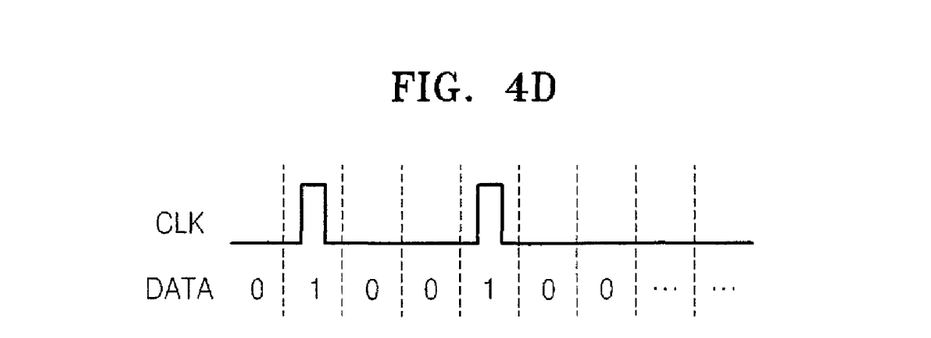
FIG. 4D illustrates the format of data used in the Infrared Data Association (IrDA)

FIG. 4D illustrates the format of data used in the Infrared Data Association (IrDA).

Referring to FIG. 4D, the IrDA outputs a peak signal if a logic high signal is transmitted. As mentioned above, the bit decoding unit 373 included in the bit processing unit 370 receives a signal as illustrated in FIG. 4D and converts the received signal into data suitable to be stored in the buffer memory 310.

Data forms used by MPSI types, such as an I2S and the like, other than those shown in FIGS. 4A through 4D would be obvious to those of ordinary skill in the art. Thus, the MPSI apparatus 300 according to the current embodiment of the present invention programs the SFRs 335 and the FSM 339 according to a required MPSI and generates and receives packet data through the data generation and processing unit 350, thereby flexibly changing the operation of the MPSI according to a required protocol.

Figure 5:
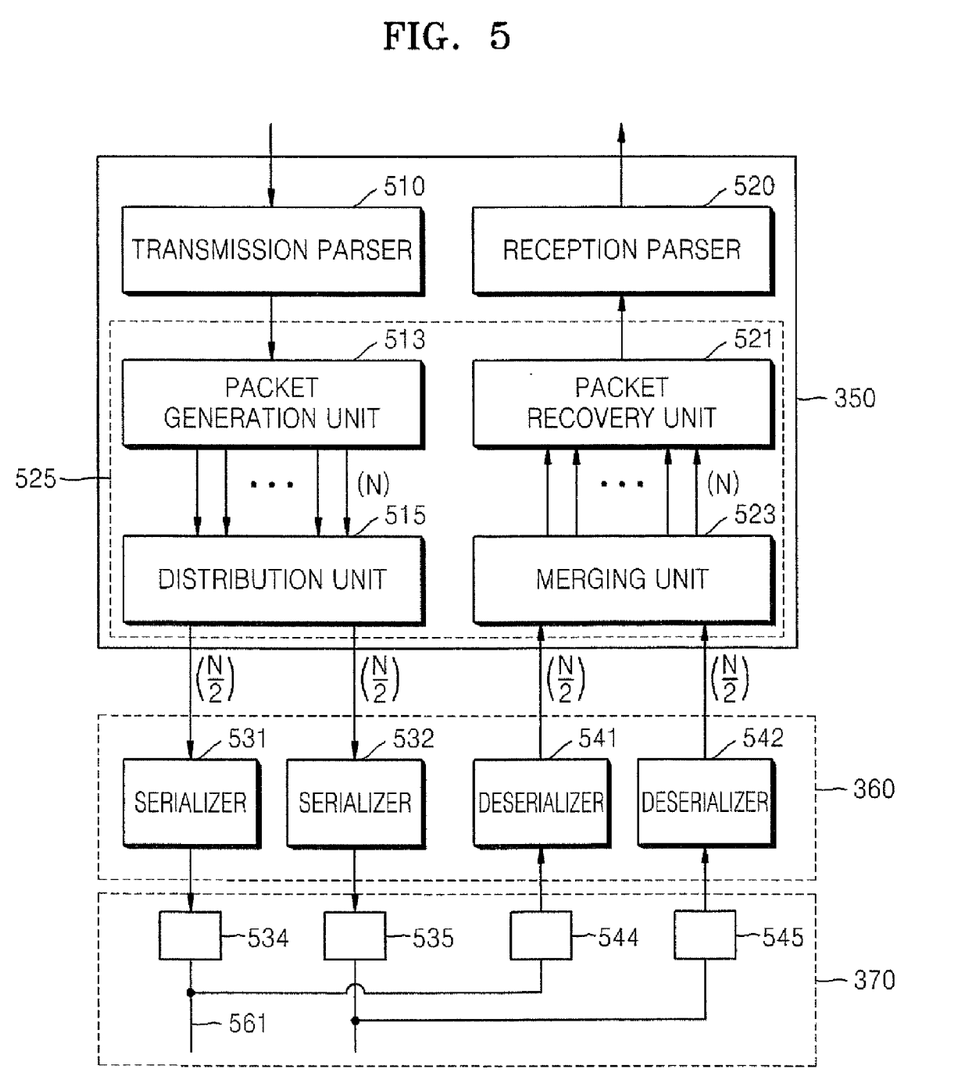
FIG. 5 is a detailed block diagram of a data generation and processing unit of the MPSI apparatus illustrated in FIG. 3, in some embodiments according to the present invention.

FIG. 5 is a detailed block diagram of the data generation and processing unit 350 illustrated in FIG. 3, according to an embodiment of the present invention.

The data generation and processing unit 350 is activated when an MPSI using data in a packet form is required. The data generation and processing unit 350 is activated to generate a header, a CRC, and an ECC required for packet data under the control of the SFRs 335 and the FSM 339.

First, the operation of a transmission side of the data generation and processing unit 350 will be described.

A packet generation unit 513 extracts data required to generate a header, a payload, a CRC, and an ECC from information data stored in the buffer memory 310 or state data stored in the SFRs 335. Using the extracted data, the packet generation unit 513 generates a header, a payload, a CRC, and an ECC. The packet generation unit 513 then arranges the generated header, payload, CRC, and ECC in a particular order, thereby generating packet data. Although the header, the ECC, the payload, and the CRC of the packet data are generally arranged in this sequential order, they may also be arranged in other orders.

Data of the payload is actual information data. The CRC is used to detect an error in transmitted data and to indicate the end of the payload. The ECC having information about an error included in packet data is used to recover data having the error. The generated packet data is output to a distribution unit 515. The packet generation unit 513 outputs a particular number of bits or bytes of data in parallel. For example, if the generated packet data totals 320 bytes and is transmitted in units of 32 bytes, the packet generation unit 513 outputs 10 signals in parallel. The number of signals that are output in parallel may vary with the number N of signal lines.

The distribution unit 515 divides signals that are transmitted in parallel through N signal lines into several groups and distributes the groups to serializers 531 and 532. In FIG. 5, two serializers 531 and 532 are provided. Thus, the distribution unit 515 divides N signals into two groups and outputs N/2 parallel signals to each of the serializers 531 and 532.

The serializer 361 may include a plurality of serializers 531 and 532. The deserializer 363 may include a plurality of deserializers 541 and 542. Herein, two serializers 531 and 532 and two deserializers 541 and 542 are provided in the transmission side and a reception side, respectively. Each of the serializers 531 and 532 serializes data that is output in parallel from the distribution unit 515 into serial data.

The serializers 531 and 532 are connected to bit encoders 534 and 535, respectively.

Herein, an output signal line 561 may also be used as an input signal line.

Hereinafter, the operation of the reception side of the data generation and processing unit 350 will be described.

A merging unit 523 merges N/2 signals transmitted from each of the two deserializers 541 and 542 to output N signals.

A packet recovery unit 521 receives transmitted packet data and divides the packet data into a header, an ECC, a payload, and a CRC. By analyzing data of each of the header, the ECC, the payload, and the CRC, the packet recovery unit 521 extracts information data and state data. The packet recovery unit 521 then transmits the extracted information data and state data to the controller 330 or the buffer memory 310.

The packet recovery unit 521 rearranges pure information data extracted from the payload into a form suitable to be stored in the buffer memory 310 and then transmits the rearranged data to the buffer memory 310. The header, the ECC, or the CRC is transmitted to the SFRs 335 of the controller 330 for error detection, error correction, or recovery of lost information data.

The parsers 510 and 520 may also be positioned outside of the processing unit 350.

In other words, the transmission side of the data generation and processing unit 350 includes the parser 510, the packet generation unit 513, and the distribution unit 515. The reception side of the data generation and processing unit 350 includes the parser 520, the packet recovery unit 521, and the merging unit 523.

Hereinafter, the operation and structure of the transmission side of the data generation and processing unit 350 will be described.

The parser 510 extracts data required to generate a header, a payload, a CRC, and an ECC from data stored in the buffer memory 310. The parser 510 then transmits the extracted data to the packet generation unit 513.

The packet generation unit 513 generates the header, the payload, the CRC, and the ECC using the extracted data. Herein, the header, the payload, the CRC, and the ECC have already been described above. The generated header, payload, CRC, and ECC are arranged in a particular order, thereby generating packet data.

The packet data is transmitted to the distribution unit 515. The operation and function of the distribution unit 515 have already been described above.

Hereinafter, the operation of the reception side of the data generation and processing unit 350 will be described.

The function and structure of the merging unit 523 have already been described above.

The packet recovery unit 521 receives transmitted packet data and divides the received packet data into a header, an ECC, a payload, and a CRC. The packet recovery unit 521 then analyzes data of each of the header, the ECC, the payload, and the CRC, thereby extracting information data and state data. The packet recovery unit 521 transmits the extracted data to the controller 330 or the parser 520. The header, the ECC, or the CRC is transmitted to the SFRs 339 of the controller 330 for error detection, error correction, or recovery of lost information data.

The parser 520 rearranges pure information data extracted from the payload into a form suitable to be stored in the buffer memory 310 and transmits the rearranged data to the buffer memory 310.

Figure 6:
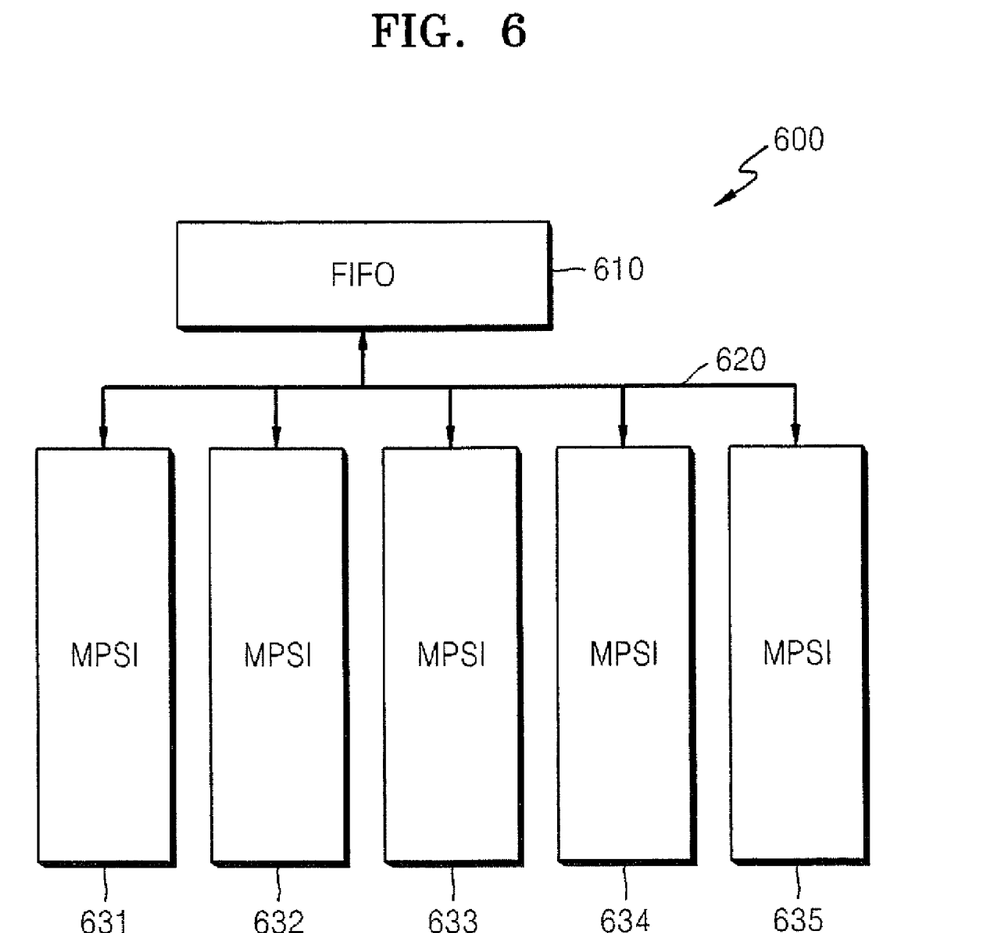
FIG. 6 is a block diagram of an MPSI block in some embodiments according to the present invention.

FIG. 6 is a block diagram of an MPSI block according to another embodiment of the present invention.

Referring to FIG. 6, the MPSI block according to the current embodiment of the present invention includes a buffer memory 610 that is shared by a plurality of MPSIs 631 through 635.

In an SOC apparatus including a plurality of MPSIs, the number of MPSIs used at the same time is limited. Thus, if four MPSIs are generally used at the same time in an SOC apparatus including 5 MPSIs, a buffer memory having a capacity that is sufficient for 4 MPSIs is shared by the 4 MPSIs.

Each of the MPSIs 631 through 635 corresponds to the MPSI apparatus 300 illustrated in FIG. 3 according to a previous embodiment of the present invention. As illustrated in FIG. 6, the buffer memory 610 is shared, thereby reducing the capacity of the buffer memory 610 and thus reducing the entire chip size.

As is apparent from the foregoing description, the MPSI apparatus according to the present invention generates and receives data corresponding to each of a plurality of protocols, thus being capable of being used according to any type of protocol.

Moreover, the SOC apparatus including a plurality of MPSIs according to the present invention removes a need for unnecessary IP blocks, thereby improving use efficiency.

While the present invention has been particularly shown and described with reference to exemplary embodiments thereof, it will be understood by those of ordinary skill in the art that various changes in form and detail may be made therein without departing from the spirit and scope of the present invention as defined by the following claims.

What is claimed:

1. A multi-protocol serial interface (MPSI) apparatus comprising:
    a controller circuit configured to receive information about a type of MPSI utilized for data transfer and configured to control a format of the data transfer and input/output timing associated with the data transfer; and
    a data generation and processing circuit configured to extract information from a buffer memory to generate data for the data transfer according to the format based on the information and configured to generate the data in a packet format or a bit format based on the information, wherein the packet or bit format is selected on a transfer-by-transfer basis responsive to a value programmed to a special function register by an external central processing unit (CPU) via software requests.

2. The MPSI apparatus of claim 1, wherein the data generation and processing circuit is configured to extract information data and state data from the data received from outside the MPSI apparatus and configured to output the information data and the state data to the buffer memory or the controller circuit, according to the type of MPSI.

3. The MPSI apparatus of claim 2, wherein the data generation and processing circuit comprises:
    a transmission data generation circuit configured to generate and output the data in the packet format using the information extracted from the buffer memory or provided by the controller circuit and configured to output the information data in the binary bit format; and
    a reception data processing circuit configured to receive the data transmitted from outside the MPSI apparatus and to separate received information into the state data and the information data, wherein the state data is provided to the controller circuit and information data is provided to the buffer memory in a binary bit form, according to the type of MPSI.

4. The MPSI apparatus of claim 3, wherein the transmission data generation circuit comprises a packet generation circuit configured to generate a transmit payload, a transmit header, a transmit cyclic redundancy check (CRC), and a transmit error correction code (ECC) from the information in the buffer memory or provided by the controller circuit.

5. The MPSI apparatus of claim 4, wherein the reception data processing circuit comprises a packet recovery circuit configured to separate the data received from outside into different portions comprising a received payload, a received header, a received CRC, and a received ECC and is configured to extract received information data and received state data from the different portions to provide the information data and the state data to the controller circuit or to the buffer memory.

6. The MPSI apparatus of claim 5, wherein the transmission data generation circuit and the reception data processing circuit are activated if the type of MPSI uses data in the packet format.

7. The MPSI apparatus of claim 4, wherein the packet generation circuit is configured to arrange the transmit payload, the transmit header, the transmit CRC, and the transmit ECC in a particular order in to generate the packet data for transmission and output the data in parallel as N signals via N signal lines, wherein the transmission data generation circuit further comprises:
    a distribution circuit configured to output the N signals from the packet generation circuit in parallel as M groups each including N/M signals.

8. The MPSI apparatus of claim 5, wherein the reception data processing circuit comprises a merging circuit configured to merge N signals of the received data into M groups where each group includes N/M signals to provide merged data, and wherein the reception data processing circuit is further configured to transmit the merged data to the packet recovery circuit.

9. The MPSI apparatus of claim 6, wherein the packet data generation circuit passes-through data received from the buffer memory if the type of MPSI does not use a packet format.

10. The MPSI apparatus of claim 3, wherein the data generation and processing circuit is configured to generate and/or transmit data comprising a universal asynchronous receiver/transmitter (UART) format, I square S (I2S) format, pulse coded modulation (PCM) format, a serial peripheral interface (SPI) format, an audio codec (AC) 97 format, the Infrared Data Association (IrDA) format, or an Inter-Integrated Circuit (I2C) format, and the data generation and processing unit can receive data used in any one of the UART, I2S, the PCM, the SPI, AC97, the IrDA, and I2C formats and transmit or receive the data separately as information data and state information.

11. The MPSI apparatus of claim 7, further comprising:
    a serialization/deserialization circuit configured to serialize and output data received in parallel from the data generation and processing circuit, and configured to output the received data in a serial format to the data generation and processing circuit in parallel.

12. The MPSI apparatus of claim 2, further comprising:
    a bit processing circuit configured to convert data received from the data generation and processing circuit into data used by the type of MPSI and configured to convert the received data for storage in the buffer memory.

13. The MPSI apparatus of claim 2, wherein the controller circuit comprises:
    the special function register (SFRs) is configured to control generation, input, and output of data according to the type of MPSI responsive to the software requests; and
    a finite state machine (FSM) configured to adjust the state transition of each of a plurality of intellectual property (IP) blocks included in the MPSI apparatus in response to a control signal output from the SFRs.

14. The MPSI apparatus of claim 13, wherein the controller circuit further comprises:
    a direct memory access (DMA)/interrupt controller circuit configured to control an external DMA and control an interrupt operation responsive to an interrupt request; and
    a timing generator circuit configured to generate a clock signal and adjust a point of time for a particular operation in the data generation and processing circuit.

15. The MPSI apparatus of claim 2, wherein the buffer memory is configured to store data transmitted from outside the MPSI apparatus and configured to output the data stored therein responsive to the controller circuit.

16. The MPSI apparatus of claim 15, wherein the buffer memory comprises a first-in, first-out (FIFO) memory.

17. The MPSI apparatus of claim 3, wherein the transmission data generation unit comprises:
a transmission parser extracting the information required to generate the payload, the header, the CRC, and the ECC from the buffer memory or the controller; and
a packet generation unit generating the payload, the header, the CRC, and the ECC using the information extracted by the transmission parser and arranging the generated payload, the generated header, the generated CRC, and the generated ECC in order to output packet data.

18. The MPSI apparatus of claim 17, wherein the reception data processing unit comprises:
a packet recovery unit dividing the data transmitted from outside into different portions such as the payload, the header, the CRC, and the ECC, extracting information data and state information from each of the divided portions, and outputting the extracted information data and the extracted state information to the controller or a reception parser; and
the reception parser rearranging the extracted information data into a form suitable to be stored in the buffer memory and outputting the rearranged data to the buffer memory.

19. The MPSI apparatus of claim 17, wherein the packet generation unit arranges the payload, the header, the CRC, and the ECC in a particular order in order to generate packet data and outputs the generated packet data in parallel through N signal lines, and the transmission data generation unit further comprises a distribution unit that outputs signals, which are output from the packet generation unit, in parallel as M groups.

20. The MPSI apparatus of claim 18, wherein the reception data processing unit further comprises a merging unit that merges N data, which is transmitted from outside as M groups, and transmits the merged data to the packet recovery unit.

21. The apparatus of claim 1 wherein the data generation and processing circuit is configured to extract information data and state data from the data received from outside the MPSI apparatus and configured to output the information data and the state data to the buffer memory or the controller circuit, according to the type of MPSI;
wherein the data generation and processing circuit further comprises:
a transmission data generation circuit configured to generate and output the data in the packet format using the information extracted from the buffer memory or provided by the controller circuit and configured to output the information data in the binary bit format; and
a reception data processing circuit configured to receive the data transmitted from outside the MPSI apparatus and to separate received information into the state data and the information data, wherein the state data is provided to the controller circuit and information data is provided to the buffer memory in a binary bit form, according to the type of MPSI;
wherein the transmission data generation circuit further comprises a packet generation circuit configured to generate a transmit payload, a transmit header, a transmit cyclic redundancy check (CRC), and a transmit error correction code (ECC) from the information in the buffer memory or provided by the controller circuit;
wherein the reception data processing circuit comprises a packet recovery circuit configured to separate the data received from outside into different portions comprising a received payload, a received header, a received CRC, and a received ECC and is configured to extract received information data and received state data from the different portions to provide the information data and the state data to the controller circuit or to the buffer memory;
wherein the transmission data generation circuit and the reception data processing circuit are activated if the type of MPSI uses data in the packet format;
wherein the packet generation circuit is further configured to arrange the transmit payload, the transmit header, the transmit CRC, and the transmit ECC in a particular order to generate the packet data for transmission and output the data in parallel as N signals via N signal lines, wherein the transmission data generation circuit further comprises:
a distribution circuit configured to output the N signals from the packet generation circuit in parallel as M groups each including N/M signals;
wherein the reception data processing circuit further comprises a merging circuit configured to merge N signals of the received data into M groups where each group includes N/M signals to provide merged data, and wherein the reception data processing circuit is further configured to transmit the merged data to the packet recovery circuit;
wherein the packet generation circuit passes-through data received from the buffer memory if the type of MPSI does not use the packet format; and
wherein the data generation and processing circuit is further configured to generate and/or transmit data comprising a universal asynchronous receiver/transmitter (UART) format, I square S (I2S) format, pulse coded modulation (PCM) format, a serial peripheral interface (SPI) format, an audio codec (AC) 97 format, the Infrared Data Association (IrDA) format, or an Inter-Integrated Circuit (I2C) format, and the data generation and processing unit is configured to receive data used in any one of the UART, I2S, the PCM, the SPI, AC97, the IrDA, and I2C format and transmit or receive the data separately as information data and state information.

22. A system-on-chip (SOC) apparatus comprising:
a plurality of multi-protocol serial interface (MPSI) apparatuses, wherein each of the MPSI apparatuses comprises:
a controller circuit configured to receive information about a type of MPSI utilized for data transfer and configured to control a format of the data transfer and input/output timing associated with the data transfer; and
a data generation and processing circuit configured to extract information from a buffer memory to generate data for the data transfer according to the format based on the information and configured to generate the data in a packet format or a bit format based on the information, wherein the packet or bit format is selected on a transfer-by-transfer basis responsive to a value programmed to a special function register by an external central processing unit (CPU) via software requests.

23. The SOC apparatus of claim 22, wherein the data generation and processing unit extracts information data and state data from the data transmitted from outside and outputs the extracted information data and the extracted state data to the buffer memory or the controller, according to the required MPSI.

24. The SOC apparatus of claim 23, wherein the data generation and processing unit comprises:

a transmission data generation unit generating and outputting data in a packet form using information extracted from the buffer memory or the controller or outputting data in a binary bit form, according to the required MPSI; and a reception data processing unit receiving the data transmitted from outside dividing the received data into the state data and the information data for transmission to the buffer memory or the controller or outputting data in a binary bit form, according to the required MPSI, wherein the transmission data generation unit comprises a packet generation unit that extracts information required to generate a payload, a header, a cyclic redundancy check (CRC), and an error correction code (ECC) from the buffer memory or the controller and generates the payload, the header, the CRC, and the ECC using the extracted information.

25. The SOC apparatus of claim 23, further comprising:
a memory controller controlling input to and output from an external memory;
a central processing unit (CPU) controlling the overall operation of the SOC; and
a data bus serving as a data movement path.

* * * * *